(12) United States Patent
Wong et al.

(10) Patent No.: US 7,206,918 B2
(45) Date of Patent: *__Apr. 17, 2007__

(54) ADDRESS PREDICTING APPARATUS AND METHODS

(75) Inventors: Wayne A. Wong, Seattle, WA (US); Christopher B. Wilkerson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 10/916,881

(22) Filed: Aug. 12, 2004

(65) Prior Publication Data

US 2005/0010740 A1    Jan. 13, 2005

Related U.S. Application Data

(63) Continuation of application No. 09/741,371, filed on Dec. 19, 2000, now Pat. No. 6,785,797.

(51) Int. Cl.
*G06F 12/06*    (2006.01)

(52) U.S. Cl. .................. 711/213; 711/216; 711/220; 711/221; 711/218; 711/5; 711/1; 711/137

(58) Field of Classification Search .............. None
See application file for complete search history.

(56) References Cited

U.S. PATENT DOCUMENTS

| | | | |
|---|---|---|---|
| 4,807,110 A | 2/1989 | Pomerene et al. | 364/200 |
| 5,817,543 A | 10/1998 | McAllister et al. | 438/109 |
| 5,850,533 A | 12/1998 | Panwar et al. | 395/392 |
| 5,895,966 A | 4/1999 | Penchuk | 257/690 |
| 5,898,853 A | 4/1999 | Panwar et al. | 395/392 |
| 5,930,819 A | 7/1999 | Hetherington et al. | 711/131 |
| 6,005,503 A | 12/1999 | Burrows | 341/67 |
| 6,052,775 A | 4/2000 | Panwar et al. | 712/215 |
| 6,055,622 A | 4/2000 | Spillinger | 712/207 |
| 6,065,105 A | 5/2000 | Zaidi et al. | 712/23 |
| 6,081,873 A | 6/2000 | Hetherington et al. | 711/131 |
| 6,122,727 A | 9/2000 | Witt | 712/214 |

FOREIGN PATENT DOCUMENTS

| | | |
|---|---|---|
| EP | 0335358 | 10/1989 |
| FR | 2622346 | 4/1989 |
| JP | 06-349678 | 12/1994 |

OTHER PUBLICATIONS

Tech Encyclopedia, http://www.techweb.com/encyclopedia/defineterm?, (2000), 5p.*

(Continued)

*Primary Examiner*—B. James Peikari
(74) *Attorney, Agent, or Firm*—Schwegman, Lundberg, Woessner & Kluth, P.A.

(57) ABSTRACT

Apparatus and methods for addressing predicting useful in high-performance computing systems. The present invention provides novel correlation prediction tables. In one embodiment, correlation prediction tables of the present invention contain an entered key for each successor value entered into the correlation table. In a second embodiment, correlation prediction tables of the present invention utilize address offsets for both the entered keys and entered successor values.

54 Claims, 6 Drawing Sheets

OTHER PUBLICATIONS

"Cache Memeory", Geek.com, http://www.geek.com/glossary_search.cgi?cache, (2000), 1 p.*

Alexander, T., et al., "Distributed Prefetch-buffer/Cache Design for High Performance Memory Systems", *IEEE Second International Symposium on High Performance Computer Architecture*, (Feb. 1996), 254-263.

Charney, M. J., et al., "Prefetching and memory system behavior of the SPEC95 benchmark suite", *IBM Journal of Research and Development*, 41 (3), (May 1997), pp. 265-286.

Joseph, Doug , et al., "Prefetching Using Markov Predictors", *Computer Architecture News*, 25 (2), (Jun. 1997), pp. 252-263.

* cited by examiner

Cache miss address stream:
a, v, b, c, d, e, a, w, c, b, d, e, a, x, d, a, y, c, a, z

| key | successors | | | |
|---|---|---|---|---|
| | MRU | | | LRU |
| a | z | y | x | w |
| b | d | c | | |
| c | a | b | d | |
| d | a | e | | |
| e | a | | | |
| v | b | | | |
| w | c | | | |
| x | d | | | |
| y | c | | | |

Address Steam:
A, b, C, D, E, f, g, h, A, b, I, j, K, m

| bank | 1 | | 2 | | 3 | | 4 | |
|---|---|---|---|---|---|---|---|---|
| | key | successor | key | successor | key | successor | key | successor |
| | A | b | K | m | E | f | I | j |

FIG. 5

Address Steam:
A, b, C, d, E, f, g, h, I, J, K, M, N, o, P, q, A, b, R, s, A, t

| bank | 1 | | 2 | | 3 | | 4 | |
|---|---|---|---|---|---|---|---|---|
| | key | successor | key | successor | key | successor | key | successor |
| MRU | A | b | A | t | P | q | R | s |
| LRU | K | m | N | o | E | f | I | j |

FIG. 6

Address stream:
    0, 10, 27, 4, 54, 30, 40, 57                              70

| key address | correlation value address |
|---|---|
| 0 | 10 |
| 10 | 27 |
| 27 | 4 |
| 4 | 54 |
| 54 | 30 |
| 30 | 40 |
| 40 | 57 |

FIG. 7
(PRIOR ART)

Address stream:
    0, 10, 27, 4, 54, 30, 40, 57

Difference stream:
    10, 17, -23, 50, -24, 10, 17                              80

| key offset | successor offset |
|---|---|
| 10 | 17 |
| 17 | -23 |
| -23 | 50 |
| 50 | -24 |

FIG. 8

ADDRESS PREDICTING APPARATUS AND METHODS

CROSS-REFERENCE TO RELATED APPLICATIONS

The present application is a continuation of U.S. Ser. No. 09/741,371, filed Dec. 19, 2000, now issued as U.S. Pat. No. 6,785,797, which is incorporated herein by reference.

FIELD OF THE INVENTION

The present invention relates to high performance memory system architectures. More specifically, the present invention relates to address predicting apparatus and methods useful in high-performance computing systems.

BACKGROUND OF THE INVENTION

The speed at which computer processors can execute instructions continues to outpace the ability of computer memory systems to supply instructions and data to the processors. Consequently, many high-performance computing systems provide a high-speed buffer storage unit, commonly called a cache or cache memory, between the working store or memory of the central processing unit ("CPU") and the main memory.

A cache comprises one or more levels of dedicated high-speed memory holding recently accessed data, designed to speed up subsequent access to the same data. For the purposes of the present specification, unless specified otherwise data will refer to any content of memory and may include, for example, instructions, data operated on by instructions, and memory addresses. Cache technology is based on the premise that computer programs frequently reuse the same data. Generally, when data is read from main system memory, a copy of the data is saved in the cache memory, along with an index to the associated main memory. For subsequent data requests, the cache detects whether the data needed has already been stored in the cache. For each data request, if the data is stored in the cache (referred to as a "hit"), the data is delivered immediately to the processor while any attempt to fetch the data from main memory is not started or aborted if already started. On the other hand, if the requested data is not stored in the cache (referred to as a "miss") then it is fetched from main memory and also saved in the cache for future access.

A level 1 cache ("L1") generally refers to a memory bank built closest to the central processing unit ("CPU") chip, typically on the same chip die. A level 2 cache ("L2") is a secondary staging area that feeds the L1 cache. L2 may be built into the CPU chip, reside on a separate chip in a multichip package module, or be a separate bank of chips.

Address predictors are used to anticipate or predict future addresses in applications such as data prefetching or instruction scheduling. Prefetching systems and methods attempt to reduce memory latency by reducing the probability of a cache miss. The probability of a cache miss is reduced by anticipating or predicting what information will be requested before it is actually requested. Address predictors utilizing correlation prediction tables ("CPTs") for predicting both instruction addresses and data addresses are known.

A simple correlation found in a CPT is a pair consisting of a key and a successor value. The key is used to predict the successor value. A correlated address pair ("CAP") is built by associating two addresses that appear in an address stream. The address that appears earlier in the address stream is referred to as the key and it is paired with the currently referenced address, which is referred to as the successor value. The CAP (that is, a key and its successor value) is then stored in a CPT for later use. When an address previously selected as a key reoccurs in the address stream, it is used to query the CPT to retrieve the corresponding CAP. The successor value in the retrieved CAP is then used to predict the next address in the address stream. In sum, a goal of address predictors is to observe previous address pairs, store them, and use them as predictions in the future.

Correlations in a CPT can be built from cache miss addresses and used to predict future miss addresses. For example, when a cache miss is generated, a correlation is built between the preceding cache miss address and the current cache miss address. The next time that the key address generates a cache miss, the predictor speculates that the successor address will be the next cache miss.

One approach to improving the performance of a CPT is to implement the CPT with the ability to correlate a single key with multiple successor values. This can be achieved by entering a key with multiple successor values for each key entered. That is, each unique key is stored or entered into the CPT only once. If the key associated with a subsequent correlation to be entered is already entered into the CPT, then the successor value is entered into the same line as the already entered key, but the associated key is not entered again. Generally, when a key is correlated with more than one successor value, the successors are predicted using a most recently used ("MRU") priority and replaced with a least recently used ("LRU") priority.

However, this approach to improving the performance of a CPT is not without drawbacks. First, because the total table size is constant, a CPT designer is faced with undesirable tradeoffs between the maximum possible number of successors per entered key and the maximum possible number of keys entered. The maximum number of entered successors per entered key is static and cannot be changed depending on the application. Thus, a CPT designer must decide apriori how many successors can be associated with a given entered key. However, this decision can be difficult. Some addresses are highly correlated and need only one successor for their correlations. Other addresses may be followed by several different addresses at various points during program/application execution and benefit from multiple successors. Since the total size of a CPT is constant, increasing the number of entered successors per key requires that the total number of entered keys be decreased.

The second drawback to this approach relates to replacing correlations previously entered into a CPT. When a correlation is replaced, all correlations corresponding to the same key are lost, including the key and all corresponding successor values stored. The removed correlations can only be reentered into the CPT if and when the correlations reappear in the cache miss addresses. This rebuilding of a previously removed correlations can have a severe impact on the performance of the CPT.

The speed at which computer processors can execute instructions will likely continue to outpace the ability of computer memory systems to supply instructions and data to the processors. Although address predictors can be utilized to improve the performance of computer memory systems, existing address predictors have some drawbacks. Accordingly, there is still a need in the industry to improve memory system performance in computer systems by improving existing address predictors and address prediction methods.

DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 5 illustrates an example of a LRU policy for choosing a victim.

FIG. 6 illustrates an example of a set update policy for an associative correlation prediction table.

FIG. 7 illustrates an example of a correlation prediction table built according to the prior art.

FIG. 8 illustrates an example of an embodiment of the present invention utilizing offset correlation.

DETAILED DESCRIPTION OF THE INVENTION

In the following detailed description of the present invention, reference is made to the accompanying Drawings, which form a part hereof, and in which are shown by way of illustration specific embodiments in which the present invention may be practiced. It should be understood that other embodiments may be utilized and structural changes may be made without departing from the scope of the present invention.

The present invention provides novel address predictors and methods for address prediction that can be advantageously utilized in computing systems. Some implementation details have not been described in the present specification to avoid obscuring the invention. Nonetheless, the present specification provides sufficient detail to practitioners having ordinary skill in the computer and data processing arts to understand and to practice the present invention.

The present invention addresses one or more of the prior art drawbacks identified above by providing novel address predictors and methods for address prediction. In one embodiment, the present invention is an address predictor comprising a correlation prediction table containing entered correlations, each entered correlation comprising an entered key and an entered successor. In a second embodiment, the present invention is an address predictor comprising a correlation prediction table containing correlations, each correlation representing a key and a successor value with each key and successor value being an address offset. In a third embodiment, the present invention is a method for predicting addresses comprising entering correlations in a correlation prediction table such that each key is entered into the correlation prediction table along with its corresponding successor value. In a fourth embodiment, the present invention is a method for predicting addresses comprising entering address correlations into a correlation prediction table such that each entered key and each entered successor value is an address offset. In a fifth embodiment, the present invention is a computing system comprising address predictors according to the present invention.

The present invention provides novel methods and CPT structures that exhibit numerous advantages over the prior art. Examples of advantages of the present invention include the following. CPTs can be constructed wherein the maximum number of successor values per unique key is bounded only by the maximum table size rather than being fixed at the time of CPT design to a number smaller than the table size would otherwise allow. The impact of replacing lines having multiple successors is reduced or eliminated. More correlations per entered key are allowed and CPT's can be constructed that allow predictions based on addresses that have not appeared before in an address stream. Other advantages of the present invention will become apparent upon reading the present specification.

Figure 1:
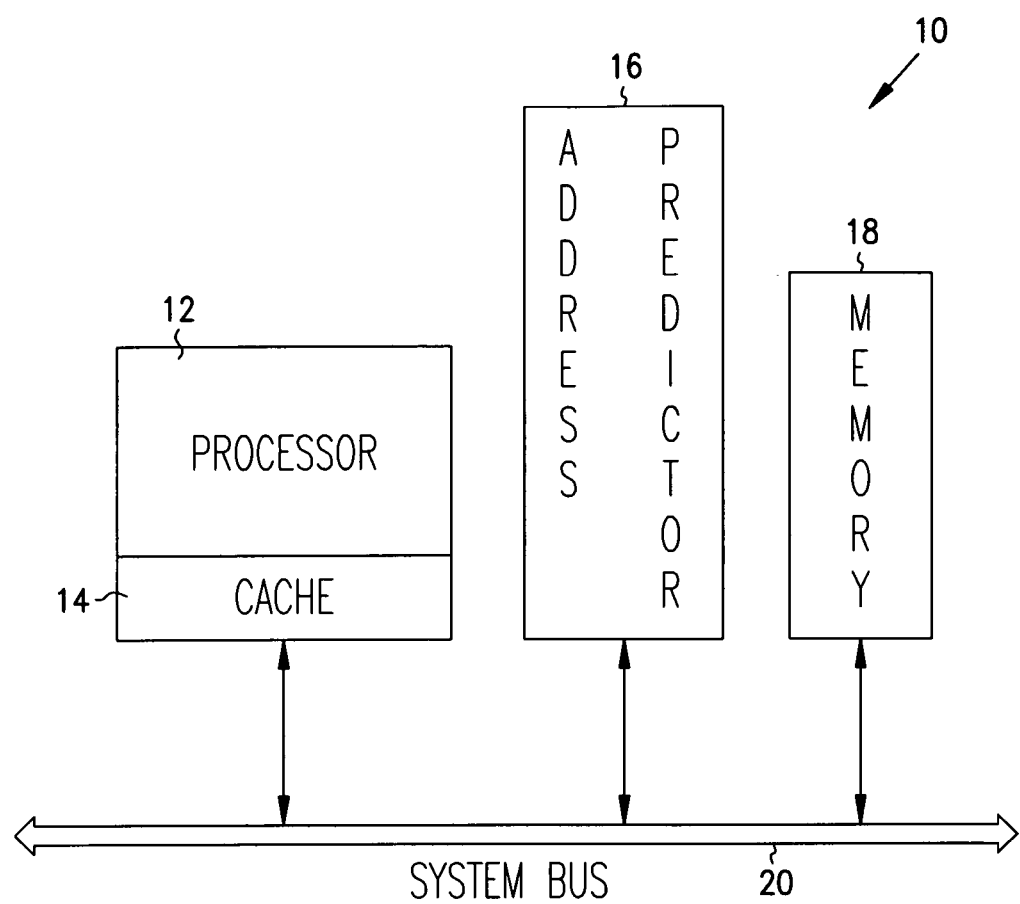
FIG. 1 illustrates an example of a computing system utilizing an address predictor.
Figure 2:
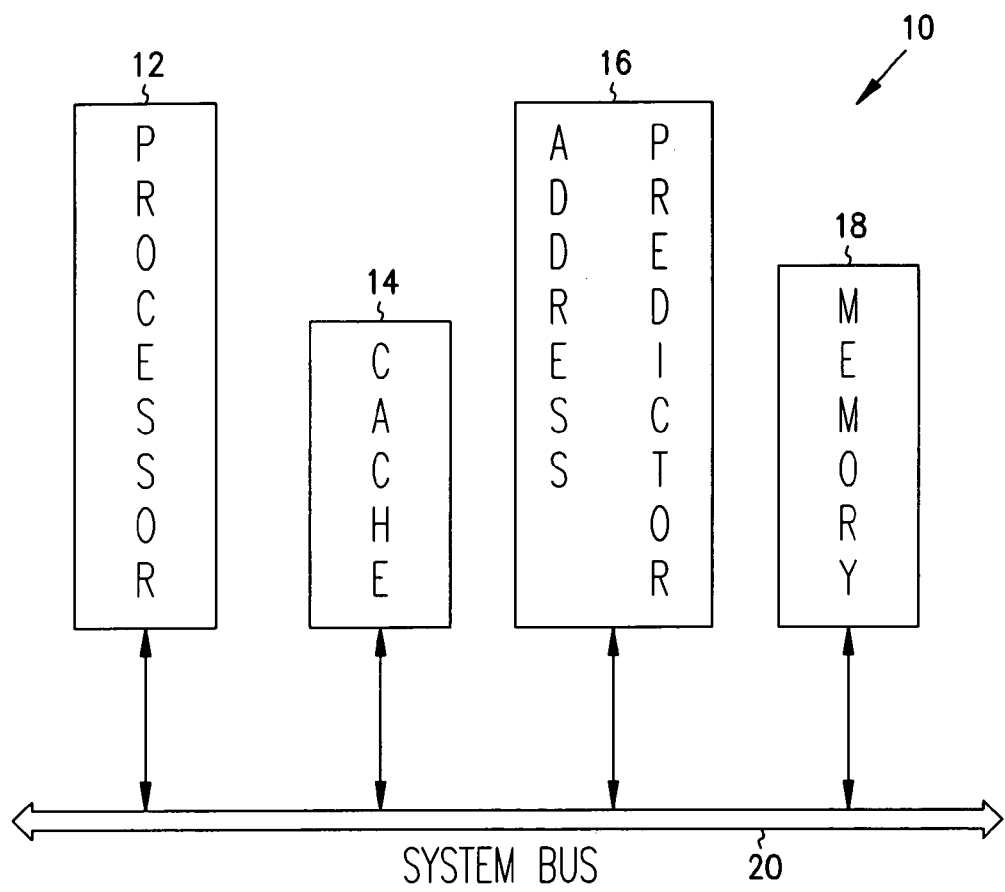
FIG. 2 illustrates a second example of a computing system utilizing an address predictor.

FIG. 1 and FIG. 2 each illustrate an embodiment of a high-performance computing system 10 in which a processor 12 is connected with a cache 14, an address predictor 16, and a memory 18 over a system bus 20. In FIG. 1, the cache 14 is implemented on the same semiconductor device as is the processor 12 (that is, an L1 cache). FIG. 2, illustrates a similar embodiment as FIG. 1, differing only in that the cache 14 is not on the same semiconductor device as the processor 12. The system bus 20 should be construed broadly as a logical construct representing collectively the circuitry that connects the other elements. Thus, the system bus 20 is the mechanism or device used to allow the other elements to communicate with each other. The specific implementation of the system bus 20 is not particularly critical to the present invention. For example, in one embodiment the system bus 20 may comprise both an address bus and a data bus. If the processor 12 and the cache 14 reside on a single chip then the connecting circuitry can be thought of as part of the system bus 20. Practitioners of ordinary skill in the art will readily understand how to implement a system bus 20 in accordance with the present invention. Processors 12 are frequently referred to as CPUs or microprocessors. The memory 18 is typically random access memory ("RAM"), but practitioners of ordinary skill in the art will readily understand that other types of memory can also be advantageously utilized in conjunction with the present invention. The Address Predictor 16 comprises a CPT and can be utilized as a data prefetcher or instruction scheduler, for example. Practitioners of ordinary skill in the art will understand how to utilize a CPT in or as an Address Predictor 16.

Figure 3:
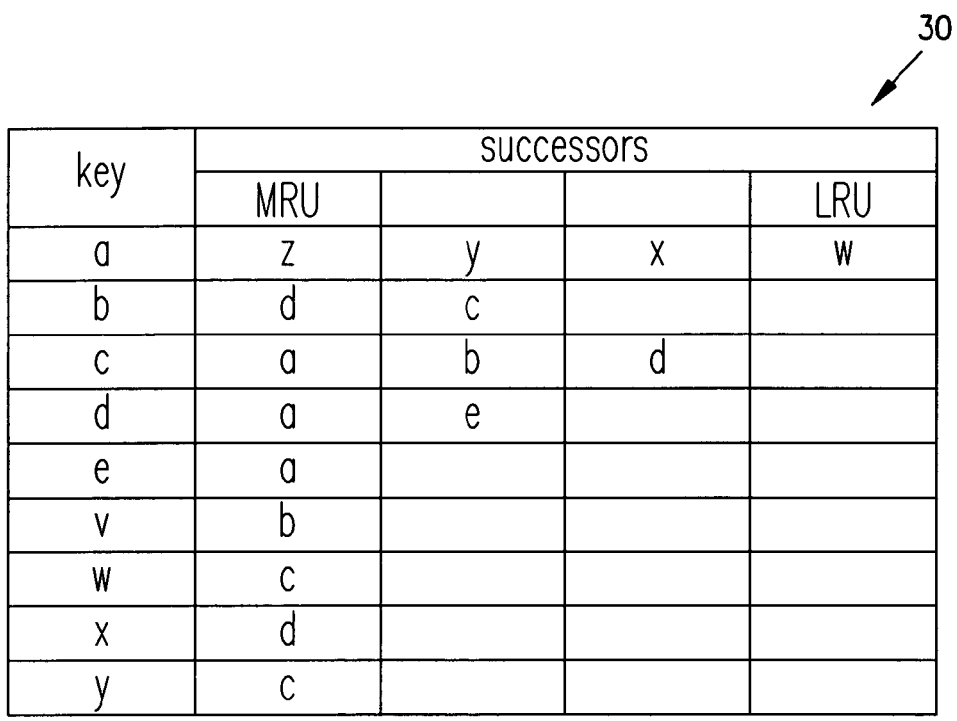
FIG. 3 illustrates an example of a correlation prediction table built according to the prior art.

FIG. 3 illustrates an example of a CPT 30 built according to the prior art. The correlations in 30 were built between cache miss addresses. Each line in CPT 30 maintains correlations between a key and multiple successors. The CPT 30 can store up to four successor addresses per key address. Successors are replaced with a LRU policy.

As illustrated in FIG. 3 one of the lines in CPT 30 contains four successors for key a and other lines only contain one or two successors per key. This illustrates at least two drawbacks in the design of CPT 30. First, there is unused or wasted space in the lines having less than four keys. These wasted spaces will be referred to as empty entries. A reduction in the maximum number of successors per key allowed might reduce the amount of unused space and increase the number of keys that can be entered, but some keys, like a, would have the number of successor addresses reduced. Second, if key a were needed to be replaced, all four of its successors would be lost unless and until they could be rebuilt at a later point in time.

Figure 4:
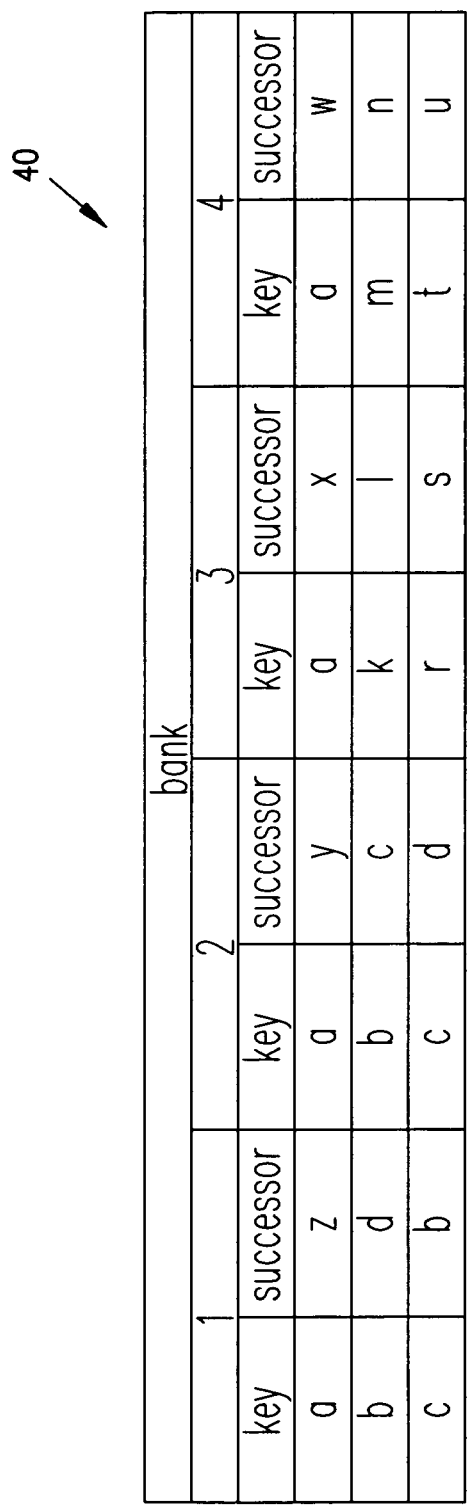
FIG. 4 illustrates an embodiment of the present invention.

FIG. 4 shows an embodiment of the present invention. According to the embodiment shown in FIG. 4, each successor value is entered along with its corresponding key. This is evident upon examination of the first line of the CPT 40 illustrated in FIG. 4 where four different successor values are each entered along with key a. Thus, each key is permitted to be entered in multiple banks in the CPT 40. Thus, in CPT 40, key a is entered four different times.

The above innovation allows a single correlation in a CPT of the present invention to be replaced without having to replace an entire line, saving other correlations having the same key. For example, if the correlation (a, w) in FIG. 4 needed to be replaced, it could be done without removing the other three correlations corresponding to key a. That is, correlations (a, z), (a, y), and (a, x) would not have to be removed. Additionally, the above innovation allows CPTs of the present invention to utilize all available space, leaving no empty entries.

In one embodiment of the present invention, each key appears at most once in each column or bank of the CPT. Thus, no duplicate keys appear in any one bank. This restriction prevents one key from allocating all entries in a CPT.

When a new correlation needs to be added to a CPT, an existing correlation is replaced or removed. The replaced correlation is referred to as the victim. When choosing a victim, typically the entry in the LRU column is chosen, independent of whether the key exists already in the table. However, other replacement policies can be advantageously utilized This method of choosing a victim is illustrated in FIG. 5. In FIG. 5, the capitalized letters in the sample address stream are addresses that map to the same direct mapped set in CPT 50. When the correlation (K, m) is added to CPT 50, the least recently used correlation for this particular set, (C, d), is in bank 2 and is replaced or victimized.

For associative tables, correlations with the referenced key can be made the MRU entry of their respective sets. However, other priority policies are possible. FIG. 6 illustrates the set update policy for associative CPTs 60 according to the present invention. When a correlation is made, existing correlations with the same key are made the MRU entries in their respective set. For the example in FIG. 6, the capitalized addresses belong to the same set. When the correlation (A, t) is made, the correlation (A, b) in bank 1 is made the MRU entry.

These innovations and embodiments of the present invention were tested by running experiments with a cache hierarchy that consisted of one level of cache. The CPT was behind the L1 cache and was used to predict L1 cache misses. The L1 cache miss stream was used both to build correlations and initiate predictions. The L1 caches were 4-way associative with 32-byte lines. Table 1 shows the cache miss characteristics of the applications used in the experiments for various sizes of 4-way associative caches. The workload contains both user and system references and consists of a variety of desktop productivity, web server, and database applications. Only data references were used and all data accesses were treated as reads. The applications were run on top of the Microsoft NT 4.0 operating system.

TABLE 1

| Application | Instructions (M) | Data refs (M) | L1 data misses (M) | | |
|---|---|---|---|---|---|
| | | | 16 KB | 32 KB | 64 KB |
| Corel draw | 38.86 | 29.09 | 1.67 | 1.57 | 1.27 |
| Excel | 36.01 | 23.42 | 0.49 | 0.29 | 0.17 |
| Gcc | 26.51 | 12.55 | 0.23 | 0.12 | 0.06 |
| Go | 18.59 | 9.37 | 0.39 | 0.24 | 0.12 |
| Paradox | 30.03 | 21.50 | 0.60 | 0.38 | 0.26 |
| Pres2 | 43.71 | 23.24 | 0.92 | 0.72 | 0.53 |

TABLE 1-continued

| Application | Instructions (M) | Data refs (M) | L1 data misses (M) | | |
|---|---|---|---|---|---|
| | | | 16 KB | 32 KB | 64 KB |
| Specweb | 69.14 | 43.93 | 2.93 | 2.61 | 2.35 |
| Tpcc | 148.80 | 83.28 | 2.44 | 2.07 | 1.75 |
| Wdproc1 | 41.37 | 27.20 | 0.42 | 0.27 | 0.19 |

To evaluate the effectiveness of the present invention, the same applications used to generate the cache miss characteristics shown in Table 1 were run using both a convention CPT and a CPT according to the present invention. The CPTs were 4-way set associative. The conventional CPT allowed a maximum of four successor values per key and the CPT according to the present invention had four banks. The evaluation metric used was the prediction coverage, which is the percentage of L1 misses correctly predicted. A reference was considered correctly predicted if a correlation exists in the CPT that contains the previous address as the key and the current address as the successor. That is the reference would be a cache hit if it were prefetched.

Table 2 indicates the relative performance of the present invention CPT versus the conventional CPT. The prediction coverage data in Table 2 was normalized to that of the conventional CPT. That is, a data value of 1.0 indicates the two CPT performed equally well and a data value of 2.0 indicates that the present invention performed twice as well as the conventional CPT. For example, the 8K-line CPT of the present invention used in conjunction with a 64 KB cache performed about 11 times better than a conventional CPT when the Pres2 and Specweb applications were run. The data in Table 2 clearly indicates that for smaller CPT sizes (8K lines or fewer), the present invention utilizes the entries more efficiently.

TABLE 2

| CPT lines | 2K | 4K | 8K | 16K | 32K | 64K |
|---|---|---|---|---|---|---|
| 16 KB L1 cache | | | | | | |
| Corel draw | 23.3721 | 4.9759 | 2.3924 | 1.3705 | 1.0693 | 1.0125 |
| Excel | 3.0124 | 1.6106 | 1.2228 | 1.0024 | 0.8935 | 0.8558 |
| Gcc | 3.5575 | 1.4901 | 1.0891 | 0.9759 | 0.9301 | 0.9154 |
| Go1 | 3.7365 | 1.7956 | 1.0285 | 0.7525 | 0.6348 | 0.6165 |
| Paradox | 3.1964 | 1.7731 | 1.3154 | 1.0619 | 0.9465 | 0.9095 |
| Pres2 | 10.3485 | 3.4143 | 2.0427 | 1.217 | 1.0054 | 0.9593 |
| Specweb | 7.334 | 4.7983 | 3.1009 | 1.7327 | 1.2082 | 1.0244 |
| Tpcc | 2.9592 | 1.9999 | 1.7593 | 1.5724 | 1.3452 | 1.35 |
| Wdproc1 | 3.4553 | 1.6659 | 1.3358 | 1.203 | 1.0716 | 0.9628 |
| 32 KB L1 cache | | | | | | |
| Corel draw | 117.1024 | 11.8255 | 2.7994 | 1.4233 | 1.073 | 1.0168 |
| Excel | 4.2581 | 3.2584 | 1.7415 | 1.1817 | 0.9577 | 0.8873 |
| Gcc | 9.2474 | 4.0582 | 1.409 | 1.0996 | 0.9855 | 0.9523 |
| Go1 | 4.3507 | 3.8108 | 1.3533 | 0.8229 | 0.6424 | 0.6131 |
| Paradox | 6.7863 | 4.4574 | 2.0129 | 1.2738 | 1.0165 | 0.9455 |
| Pres2 | 29.0938 | 9.7371 | 2.9769 | 1.3342 | 1.0376 | 0.9752 |
| Specweb | 27.7977 | 11.6176 | 4.4669 | 1.9859 | 1.2751 | 1.0569 |
| Tpcc | 5.812 | 3.6372 | 2.4323 | 1.9696 | 1.5689 | 1.5433 |
| Wdproc1 | 6.6053 | 5.6101 | 2.3244 | 1.7065 | 1.3159 | 1.0595 |
| 64 KB L1 cache | | | | | | |
| Corel draw | 132.8408 | 19.0473 | 5.3085 | 1.4843 | 1.0802 | 1.0184 |
| Excel | 8.8099 | 6.8376 | 4.1325 | 1.6405 | 1.089 | 0.9408 |
| Gcc | 9.7613 | 5.5285 | 3.1935 | 1.4498 | 1.0661 | 0.9781 |
| Go1 | 5.2981 | 5.0346 | 2.8819 | 1.1425 | 0.7666 | 0.709 |
| Paradox | 12.8065 | 10.4586 | 5.264 | 1.7262 | 1.1444 | 1.0066 |

TABLE 2-continued

| CPT lines | 2K | 4K | 8K | 16K | 32K | 64K |
|---|---|---|---|---|---|---|
| Pres2 | 74.0057 | 40.2804 | 11.0718 | 1.5723 | 1.0738 | 0.9844 |
| Specweb | 118.1263 | 43.3096 | 10.9994 | 2.3268 | 1.3432 | 1.0812 |
| Tpcc | 19.5935 | 14.1391 | 6.809 | 3.287 | 2.0984 | 1.8852 |
| Wdproc1 | 25.2365 | 27.1886 | 14.0741 | 3.6979 | 1.8852 | 1.2462 |

In addition to the innovative improvements to conventional CPTs already discussed, the present invention provides additional innovative improvements. Accordingly, in another embodiment of the present invention correlations are built using address offsets as both the key and successor values instead of using addresses. Rather than building correlations from an address or reference stream, correlations are built from the difference stream. This aspect of the present invention is referred to as offset correlation. Offset correlation can be better understood by comparing FIG. 7 and FIG. 8. FIG. 7 illustrates an example of a prior art CPT 70 using addresses as both the key and successor values. FIG. 8 illustrates an example of a CPT 80 according to the present invention that uses address offsets as both the key and successor values. As can be readily observe by viewing FIG. 7 and FIG. 8, CPT 70 and CPT 80 monitor the same address stream, but enter different values as keys and successors.

Offset correlation offers significant advantages over the prior art. Conventional CPT's require a separate entry in the CPT for each correlation. This requirement has at least two disadvantages. First, the fixed correlation table size bounds the number of unique keys that may be used to build correlations and limits the number of different correlations that can exist in the CPT at any one time. For applications such as those used for scientific computation, the working set of addresses is larger than practical correlation table sizes. Thus, for these applications the correlation table frequently will not be able to keep correlations around long enough to make a prediction. Second, because the correlation key is a specific address, each correlation predicts a fixed number of specific addresses. By correlating specific addresses, the specific addresses must have been seen in the past in order to be predicted.

To overcome these limitations, the correlation built has to be more abstract such that the correlation is not for a specific address. The offset correlator is an example of a correlator that builds abstract correlations. Offset correlators build correlations between address offsets. Each address offset does not just represent the difference between two specific addresses, but represents the difference between any two addresses differing by the offset amount. Thus, each key and successor value represents more than just a single correlation. Each key and successor value entered into the CPT, not only enters the correlation actually seen in the address stream, but also enters other correlations not yet seen. In this manner, an offset can be used to predict addresses not just based on the two addresses previously appearing in an address stream, but can be used to make predictions based on previously unseen addresses having the same offset. This is a significant advantage of using offset correlation.

Offset correlation can be combined with other approaches for implementing CPTs. For example, offset correlation can be used in conjunction with the conventional CPT 30 illustrated in FIG. 3. In this manner, each address offset key could be associated with multiple successor value address offsets. Additionally, offset correlation can be utilized in conjunction with other embodiments of the present invention, such as the CPT 40 illustrated in FIG. 4. Again, instead of storing addresses, as is shown in FIG. 4, a CPT according to the present invention could store address offsets. In this manner, each address offset key could be entered along with each successor value address offset, leaving no empty entries in the CPT.

What is claimed is:

1. An address predictor, comprising:
   a first unit to build address correlations, each correlation containing
      an earlier address appearing in an address stream and
      a later address in the address stream associated with the earlier address;
   a second unit
      to construct a first entry in a data structure, the first entry containing the earlier address and a first later address; and
      to construct at least a second entry in the data structure, the second entry containing the first earlier address but a second later address, different from the first later address.

2. The address predictor of claim 1 wherein the earlier address is a key.

3. The address predictor of claim 2, wherein at least one of the first and second later addresses is a successor address to the key.

4. The address predictor of claim 3 wherein at least one of the first and second later addresses is a currently referenced address.

5. The address predictor of claim 1 wherein the data structure is a table.

6. The address predictor of claim 1 wherein each of the entries contains exactly one earlier address and exactly one later address.

7. The address predictor of claim 1 further comprising a third unit to victimize one of the entries without victimizing another of the entries having the same later address at the same time.

8. The address predictor of claim 1 wherein the data structure has multiple banks, the first and second entries being located in different ones of the banks.

9. The address predictor of claim 1 wherein the addresses in the data structure entries represent full addresses.

10. The address predictor of claim 1 wherein at least one of the addresses in each data structure entry represents a partial address.

11. The address predictor of claim 1 further comprising a cache to fetch data specified by at least one of entries.

12. The address predictor of claim 11 wherein the cache is implemented on the same semiconductor device as a processor.

13. The address predictor of claim 11 wherein the cache is implemented on a different semiconductor device from a processor.

14. The address predictor of claim 13 wherein the cache resides on a different chip in a same multichip module as the processor.

15. The address predictor of claim 11 wherein the cache retrieves data specified by at least one of the entries from a memory.

16. A system comprising:
   a system bus;
   a processor connected to the system bus;
   a cache connected to the system bus;
   a memory connected to the system bus; and
   an address predictor connected to the system bus, the address predictor including a correlation storage unit containing a plurality of entries each having an earlier address from an instruction stream and a later address from the instruction stream, comprising an entered key and an entered successor value, multiple ones of the entries having duplicate first addresses but mutually different later addresses.

17. The system of claim 16 wherein each of the entries contains exactly one earlier address and exactly one later address.

18. The system of claim 16 wherein the address predictor includes a unit to victimize only one of the multiple ones of the entries at a time.

19. The system of claim 16 wherein the earlier and later addresses represent full addresses of data stored in the memory.

20. The system of claim 16 wherein at least one of the earlier and later addresses in each entry represents an offset from addresses stored in the memory.

21. The system of claim 16 wherein the cache includes a Level 1 unit.

22. The system of claim 21 wherein the cache includes a Level 2 unit.

23. A method comprising:
building address-prediction correlations from a monitored address stream, each correlation containing
an earlier address appearing in an address stream and
a later address in the address stream associated with the earlier address;
constructing a first entry in a data structure, the first entry containing a first earlier address and a first later address; and
constructing at least a second entry in the data structure, the second entry containing the first earlier address but a second later address, different from the first later address.

24. The method of claim 23 wherein each of the entries contains exactly one earlier address and exactly one later address.

25. The method of claim 23 further comprising victimizing one of the entries without victimizing another of the entries having the same later address at the same time.

26. The method of claim 23 wherein the addresses in the data structure entries represent full addresses.

27. The method of claim 23 wherein at least one of the addresses in each data structure entry represents a partial address.

28. The method of claim 27 wherein the partial address is an address offset.

29. An address predictor, comprising a correlation prediction storage unit including a plurality of entries each containing:
a first value representing an earlier address offset from an instruction stream, and
a second value representing a later address offset from the instruction stream.

30. The address predictor of claim 29 wherein the earlier address offset is a key.

31. The address predictor of claim 29 wherein the later address offset is a successor.

32. The address predictor of claim 29 wherein each offset represents a difference between a first address and a second address in the instruction stream.

33. The address predictor of claim 32 wherein the first and second addresses are adjacent each other in the instruction stream.

34. The address predictor of claim 33 wherein the difference represents any two addresses in the instruction stream that differ by the value of the offset.

35. The address predictor of claim 29 wherein the storage unit contains a table.

36. The address predictor of claim 29 wherein each of the first values in the storage unit is necessarily unique.

37. The address predictor of claim 29 wherein each of the entries includes exactly one earlier address offset and exactly one later address offset.

38. The address predictor of claim 29 wherein the storage unit includes multiple banks, and wherein entries having duplicate earlier address offsets reside in mutually different ones of the banks.

39. A system comprising:
a system bus;
a processor connected to the system bus;
a cache connected to the system bus;
a memory connected to the system bus; and
a storage unit including a plurality of entries each containing
a first value representing an earlier address offset from an instruction stream, and
a second value representing a later address offset from the instruction stream.

40. The system of claim 39 wherein at least one of the earlier and later addresses in each entry represents an offset between different addresses in the instruction stream.

41. The system of claim 39 wherein each first value in the correlation prediction storage unit is necessarily unique.

42. The system of claim 39 wherein each of the entries in the storage unit contains a single first value and a single later value.

43. The system of claim 39 wherein the storage unit has multiple banks that contain no duplicate first values within any of the banks.

44. The system of claim 39 wherein the cache includes a Level 1 unit.

45. The system of claim 44 wherein the cache includes a Level 2 unit.

46. A method, comprising:
forming a difference stream from an address stream;
building correlations from the address stream, each correlation containing an earlier value from the difference stream and a corresponding later value from the difference stream;
entering built correlations into an address-prediction data structure.

47. The method of claim 46 wherein the difference stream comprises a sequence of address offsets.

48. The method of claim 47 wherein the offsets represent differences between different addresses in the address stream.

49. The method of claim 48 wherein the different addresses are adjacent each other in the address stream.

50. The method of claim 46 wherein the address prediction data structure includes a table, and wherein the correlations are entries in the table.

51. The method of claim 46 further comprising prohibiting the construction of correlations having duplicate keys.

52. The method of claim 46 wherein each of the correlations contains exactly one of the earlier values and exactly one of the later values.

53. The method of claim 46 further comprising victimizing only one of the later values at any point in time.

54. The method of claim 53 further comprising prohibiting duplicate earlier values in the address prediction data structure.

* * * * *